United States Patent

McMindes et al.

[11] Patent Number: 5,433,969
[45] Date of Patent: Jul. 18, 1995

[54] PROCESS FOR THE PRODUCTION OF AN IMPROVED PROTEIN GRANULE SUITABLE FOR USE AS A MEAT EXTENDER

[75] Inventors: Matthew K. McMindes, Chesterfield; Stanley H. Richert, Webster Groves, both of Mo.

[73] Assignee: Protein Technologies International, Inc., St. Louis, Mo.

[21] Appl. No.: 173,229

[22] Filed: Dec. 27, 1993

[51] Int. Cl.$^6$ ............................ A23L 1/052; A23J 3/14
[52] U.S. Cl. .................................. 426/574; 426/656; 426/802
[58] Field of Search ................ 426/574, 641, 656, 802

[56] References Cited

U.S. PATENT DOCUMENTS

| | | | |
|---|---|---|---|
| 4,276,319 | 6/1981 | Nguyen et al. | 426/574 |
| 4,391,840 | 7/1983 | Ederle et al. | 426/641 |
| 5,160,758 | 11/1992 | Parks | 426/506 |
| 5,183,683 | 2/1993 | Mott et al. | 426/641 |

*Primary Examiner*—Jeanette Hunter
*Attorney, Agent, or Firm*—Virgil B. Hill; Lawrence J. Hurst

[57] ABSTRACT

A process for the production of a a protein granule is described in which a vegetable protein isolate is hydrated to a weight ratio of about 1.5–6 parts of water to 1 part of isolate, at a temperature of about 0° C. to 10° C. The hydrated isolate is then blended and held at the indicated temperature range for a time sufficient to form a gel. The gel is then subdivided into individual granules which have improved meat like characteristics.

5 Claims, No Drawings

PROCESS FOR THE PRODUCTION OF AN IMPROVED PROTEIN GRANULE SUITABLE FOR USE AS A MEAT EXTENDER

BACKGROUND OF THE INVENTION

This invention relates to a process for the production of a hydrated protein granules from a vegetable protein isolate which is suitable for use as an extender for meat products or as an ingredient in meat analogs.

Vegetable protein products including soy flour, soy concentrates and soy isolates have become widely used and accepted food ingredients. Among the vegetable protein products which have been the most widely accepted are the textured vegetable protein materials which have gained wide acceptance a a meat extender. The extended most widely accepted are the textured vegetable protein materials which have gained wide acceptance a a meat extender. The extended meat products are comparable in nutrition and quality to the natural meat products.

A variety of textured vegetable protein materials and processes for the production have been proposed. Generally recognized as one of the first processes for texturization of protein was that described in U.S. Pat. No. 2,682,466. Edible protein filaments were produced by a spinning process similar to that for the spinning of textiles. The starting material for this texturization process was a protein isolate, which has the bulk of oil and carbohydrates removed to achieve a protein content of 90-95% by weight on a dry basis.

Although numerous texturization techniques have been proposed for materials of lower protein content such as soybean meal, soy flour or concentrates, the most widely used and commercially successful technique for the texturization of vegetable protein material is the extrusion process described in U.S. Pat. No. 3,940,495. This process produces an expanded, meat simulating product which is capable of rehydration with water and upon rehydration is highly suitable as a meat extender. This type of extender was approved for use for the School Lunch Program by the U.S. Department of Agriculture, Food and Nutrition Service (FNS Notice 219) and since then has found wide usage in this program as well as by meat processors for the production of extended meat.

Other texturization processes too numerous to categorize have also been proposed following development of the extrusion process. These processes including the extrusion process, employ lower protein content vegetable protein material s as well as vegetable protein isolates. Some of these processes describe variations in the extrusion process described above in U.S. Pat. No. 3,940,495 for achieving differences in density or functionality of the textured product as well as an improvement of modification of the flavor or texture of the resultant product. Other processes have been directed to the production of non-expanded textured products, for example, an agglomerated protein material as described in U.S. Pat. No. 4,045,590 or an unpuffed proteinaceous extrudate as described in U.S. Pat. Nos. 3,498,794 and 3,968,268.

More recently U.S. Pat. No. 4,276,319 describes an extruded, dried and granulated protein gel suitable as a meat extruder which is prepared from a vegetable protein isolate.

Several simple and effective procedures for the production of protein granules, including meat as an ingredient, are described in U.S. Pat. No. 5,160,758 and 5,183,683. These procedures have the advantage of simplicity, and do not require expensive equipment.

In spite of the commercially developed nature of the vegetable protein industry, a continuing need exists for specific types of meat extenders exhibiting specific functional properties for various food uses.

It is also an object to provide for the production of a hydrated protein material from a vegetable protein isolate which exhibits desirable functional characteristics and blends well with ground meat to provide a mixture comparable to the natural meat.

It is also an object to provide for the production of a granule which is suitable as an ingredient in meat analogs.

It is further object to provide a process for the production of the above material which is convenient and reliable to practice on a commercial basis.

SUMMARY OF THE INVENTION

The present invention relates to a process for the production of a protein granule that is suitable as an extender for various types of meat. The process represents a simple but effective means for a meat processor to extend meat products with a vegetable protein material but without the need for expensive equipment such as extruders and drying equipment.

The process of the present invention comprises hydrating a vegetable protein isolate to a weight ratio of about 1.5–6 parts of water to 1 part of isolate, preferably about 3–4 parts of water to 1 part of isolate. It is important that during hydration that the water temperature be maintained at a temperature range of about 0°–10° C. Following hydration the hydrated isolate is blended and held at the indicated temperature range for a time sufficient to form a gel. The gel is then subdivided into individual granules which have improved meat like characteristics.

DESCRIPTION OF THE PREFERRED EMBODIMENTS

The present process initially involves the selection of a vegetable protein isolate as the starting material. Vegetable protein isolates are a well-known product that are produced from vegetable protein materials such as soybeans. Typically, they are produced by solubilization of the protein from the soybeans, followed by removal of the residual carbohydrates. Subsequent acid precipitation of the solubilized protein results in a high purity proteinanceous material. Drying of the precipitated protein provides an isolate with greater than 90% protein on a dry weight basis. The choice of the exact isolate used in the present invention is not critical to its practice although preferred isolates are those obtained from soybeans and a variety of soy protein isolates are commercially available from various manufacturers. Typical isolates that may be used include "Supro 500E", "Supro 515", "Fujipro 545" and "Fujipro 540" all of which can be purchased from Protein Technologies International, Checkerboard Square, St. Louis, Mo. 63164.

Following selection of a suitable vegetable protein isolate, it is hydrated and blended to form a gel. Although, the present invention should not be considered as being dependent on specific equipment, hydration can be carried out in any type of mixer, including mixers which need not include conditions of high shear such as for example a "Buffalo Mixer" manufactured by Hantover Inc., Kansas City, Mo. This equipment may also includes means to reduce atmospheric pressure and create a vacuum thereby permitting blending to be carried out under reduced pressure. This has been found to provide an effective means of further increasing the firmness of the granules. Hydration of the vegetable protein isolate is an important step in the process of the present invention. In this regard, the vegetable protein isolate is hydrated with water, which has been cooled to a temperature of about 0° C. to 10° C. preferably 0° C. to 5° C. Preferably, hydration is carried out at this temperature range at a weight ratio of about 1.5–6 parts of water to 1 part of isolate. Preferably, the weight ratio of water to isolate is about 3–4 parts of water to 1 part of isolate.

Blending is carried out for a period of time at the temperature range to substantially hydrate the protein. High shear conditions are not necessary to achieve adequate hydration in the present invention and in fact is not preferred. The hydrated protein is then held at the indicated temperature range for a period of time sufficient to form a gel. Preferably, the hydrated and blended isolate is held at −30° C. to 10° C. for a period of time sufficient to form a firm, meat like texture. Preferably this period of time is at least about 15 minutes, and as much as 24 hours. Objectively, the requisite degree of texture is achieved when the gel has been held for a period of time sufficient to develop an Instron texture of 80 kg as measured on an Instron Universal Testing Machine and manufactured by Instron Corporation, 2500 Washington St., Canton, Mass. 02021, and as hereinafter described in the examples.

Following formation of the gel, it is then subdivided by chopping or similar means into individual protein granules having an improved meat like texture.

It is also desirable in the context of the present invention to include additional additives with the vegetable protein isolate such as flavoring, colors, and the like provided that the additive does not adversely affect the granular structure. Examples of suitable flavorings and the like include hydrolyzed vegetable proteins and natural flavorings. Salt can sometimes be added to the vegetable protein isolate although that is not generally preferred for purposes of the present invention since the salt will sometimes interfere with the granule formation depending on the amount added for flavoring purposes. It is preferable therefore, to add any salt needed for flavoring and the like during the time that the hydrated granule is mixed with or used to extend a meat product.

Likewise, vitamins and minerals can be added to improve the overall nutritional profile.

The hydrated protein granule, which is produced as described above is suitable for use as a meat extender without further treatment. The hydrated granule can be frozen in order to provide extended storage or can include various material s such as antimicrobial or antimycotic agents to provide some degree of shelf stability for the hydrated granule, provided that these additives do not interfere with the formation of the granule or are added to the surface of the granules following formation.

The following examples set forth specific but non-limiting embodiments of the present invention.

EXAMPLE 1

A soy protein isolate, "Supro 500E" available from Protein Technologies International, Checkerboard Square, St. Louis, Mo. 63164 was selected and 5000 grams was hydrated with 15,000 grams of ice water which comprised 20% by weight shaved ice and 80% cold water. The water and ice mixture had a temperature of 2° C. This provided a weight ratio of 3 parts of water to 1 part of isolate. A second protein of the above isolate comprising 5714 grams, was hydrated with 14285 grams of the ice water mixture to provide a weight ratio of 2.5 parts of water to 1 part of isolate.

The above mixtures were mixed in a 34 kg capacity Buffalo Mixer manufactured by Hantover Inc., Campbell Street, St. Louis, Mo. 64141. The mixer was turned on at 48 rpm and the isolated soy protein added. The mixture was allowed to mix for 10 minutes in order to hydrate the protein. The temperature of the hydrated isolate as it was removed from the mixer was about 8° C. For portions of each of the two hydrated isolates mixtures were held at a temperature of 10° C. for a period of time which ranged from 15 minutes to 24 hours, and compared to a control sample which was not held for any extended period.

The gelled isolates were then evaluated on an Instron Universal Testing Machine, Model 1122, manufactured by Instron Corporation, 2500 Washington Street, Canton, Mass. 02021. The machine was set up with a 1000 lb. load cell, crosshead speed of 5, a chart speed of 10 and a dial setting of 50. Three 100 gram samples were analyzed for each hydration ratio and holding period by the following procedure.

1. Calibrate the Instron with the Kramer-Shear cell according to manufacturer's standard procedure.
2. Weigh 100±1 g of sample. (Sample at 10° C.).
3. Gently load the sample into the cage. Do not pack or shake.
4. Tilt the blade section slightly to straighten the blades, and slip the blades gently into the cage. Do not compress the sample.
5. Slide the assembled shear cage into place.
6. Press down button.
7. When test is completed, gently slide the shear cell out and discard the sample.
8. Calculate the failure force (kg.) from the peak height recorded on the strip chart.

The peak heights were measured and converted into kilograms (kg). The average reading is set forth in Table 1 below.

TABLE 1

| Time (hrs) | Instron Shear (kg) 1:2.5 Hydration Ratio | Instron Shear (kg) 1:3 Hydration Ratio |
| --- | --- | --- |
| 0 | 60.15 | 31.02 |
| 0.25 | 81.72 | 45.40 |
| 0.50 | 93.07 | 46.16 |
| 1.5 | 99.98 | 50.69 |
| 24 | 222.46 | 136.96 |

The improvement in firmness of the gel commensurate with the holding time is readily apparent from the above data, particularly at the higher hydration ratio, although both hydration ratios were adequate provided that holding times were at least overnight.

The above example describes specific but non-limiting embodiments of the present invention insofar as the formation of the granules. It is intended to include within the spirit and scope of the present invention all reasonable variations and modifications thereto.

What is claimed is:

1. A process for producing a granular protein product comprising:
   (a) hydrating a vegetable protein material consisting essentially of vegetable protein isolate with water at a weight ratio of about 1.5–6 parts of water to 1 part of isolate at a temperature of about 0° C. to 10° C.;
   (b) holding said hydrated isolate at −30° C. to 10° C. for a period of time sufficient to form a gel of improved firmness; and
   (c) subdividing said formed gel to form granules of improved texture for use as a meat extender.

2. The process of claim 1 wherein the vegetable protein isolate is a soy protein.

3. The process of claim 1 wherein the isolate is hydrated at a weight ratio of about 3–4 parts of water to 1 part of isolate, 4. The process of claim 1 wherein said holding time is between about 15 and 24 hours.

5. The process of claim 1 wherein said holding time is about 1.5 hours.

* * * * *